United States Patent
Lee

(10) Patent No.: US 9,451,469 B2
(45) Date of Patent: Sep. 20, 2016

(54) APPARATUS AND METHOD FOR TUNNELED GPM

(71) Applicant: Intel Corporation, Santa Clara, CA (US)

(72) Inventor: Anthony S. Lee, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/948,485

(22) Filed: Jul. 23, 2013

(65) Prior Publication Data

US 2014/0022992 A1 Jan. 23, 2014

Related U.S. Application Data

(60) Provisional application No. 61/674,479, filed on Jul. 23, 2012.

(51) Int. Cl.
| | |
|---|---|
| *H04W 16/14* | (2009.01) |
| *H04W 68/12* | (2009.01) |
| *H04W 76/02* | (2009.01) |
| *H04W 88/06* | (2009.01) |

(52) U.S. Cl.
CPC ............ *H04W 16/14* (2013.01); *H04W 68/12* (2013.01); *H04W 76/022* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 4,484,326 A | * | 11/1984 | Turner | 370/253 |
| 5,406,550 A | * | 4/1995 | McTiffin | 370/335 |
| 5,892,924 A | * | 4/1999 | Lyon et al. | 709/245 |
| 6,195,546 B1 | * | 2/2001 | Leung et al. | 455/419 |
| 6,317,607 B1 | * | 11/2001 | Tomcik et al. | 455/552.1 |
| 7,117,000 B2 | * | 10/2006 | Chen | 455/515 |
| 7,184,447 B1 | * | 2/2007 | Koo et al. | 370/441 |
| 7,257,122 B1 | * | 8/2007 | Keturi | 370/401 |
| 7,693,164 B1 | * | 4/2010 | Busch et al. | 370/401 |
| 8,160,619 B1 | * | 4/2012 | Oroskar et al. | 455/458 |
| 8,416,790 B1 | * | 4/2013 | Busch et al. | 370/401 |
| 8,555,262 B2 | * | 10/2013 | Singh et al. | 717/143 |
| 2002/0109706 A1 | * | 8/2002 | Lincke et al. | 345/700 |

(Continued)

FOREIGN PATENT DOCUMENTS

| | | |
|---|---|---|
| CN | 1297078 C | 1/2007 |
| CN | 101227743 A | 7/2008 |
| CN | 102083147 A | 6/2011 |

OTHER PUBLICATIONS

"E-UTRAN-cdma2000 1x Connectivity and Interworking Air Interface Specification." 3rd Generation Partnership Project 2 "3GPP2". 3GPP2 C.S0097-0 Version 2.0 Apr. 2011. pp. 1-66.

(Continued)

*Primary Examiner* — Dung B Huynh
(74) *Attorney, Agent, or Firm* — Schiff Hardin LLP

(57) ABSTRACT

An apparatus provides notification of a circuit switched event over a packetized data network. The apparatus includes a packetized data modem that is configured to receive lower level packetized data over the packetized data network that comprises the notification. The packetized data modem has a first service-oriented tunneling link access control processor that is configured to decapsulate an Improved 1x Layer 3 General Page Message (IGPM) from the lower level packetized data, where the IGPM comprises a service option corresponding to the circuit switched event.

21 Claims, 4 Drawing Sheets

IMPROVED 1X LAYER 3 GENERAL PAGE MESSAGE FORMAT

— 400

| FIELD | LENGTH (BITS) |
|---|---|
| MSGTYPE | 8 |
| NUMTLACHEADERRECORDS | 4 |
| RESERVED | 3 |
| 1XL3PDULENGTH | 16 |
| SERVICEOPTION | 16 |

(56) References Cited

U.S. PATENT DOCUMENTS

| | | | |
|---|---|---|---|
| 2003/0193964 A1* | 10/2003 | Bae et al. | 370/465 |
| 2003/0225897 A1* | 12/2003 | Krawetz | 709/229 |
| 2004/0008679 A1* | 1/2004 | Sinnarajah et al. | 370/390 |
| 2004/0125793 A1* | 7/2004 | Yi et al. | 370/352 |
| 2004/0136476 A1* | 7/2004 | Rosen et al. | 375/340 |
| 2004/0203469 A1* | 10/2004 | Patel et al. | 455/67.14 |
| 2004/0204026 A1* | 10/2004 | Steer et al. | 455/550.1 |
| 2005/0096928 A1* | 5/2005 | Ruggaber et al. | 705/1 |
| 2006/0003772 A1* | 1/2006 | Semper | 455/452.1 |
| 2006/0209748 A1* | 9/2006 | An et al. | 370/328 |
| 2006/0251033 A1* | 11/2006 | Oprescu-Surcobe et al. | 370/338 |
| 2006/0276173 A1* | 12/2006 | Srey et al. | 455/410 |
| 2007/0047547 A1* | 3/2007 | Conner et al. | 370/392 |
| 2007/0060164 A1* | 3/2007 | Kim et al. | 455/450 |
| 2007/0201439 A1* | 8/2007 | Sun et al. | 370/352 |
| 2007/0211688 A1* | 9/2007 | Park et al. | 370/347 |
| 2008/0096588 A1* | 4/2008 | Waytena et al. | 455/466 |
| 2008/0112434 A1* | 5/2008 | Sayeedi | 370/469 |
| 2008/0317009 A1* | 12/2008 | Kemppainen et al. | 370/353 |
| 2009/0059958 A1* | 3/2009 | Nakata | 370/474 |
| 2009/0117924 A1* | 5/2009 | Kfoury et al. | 455/466 |
| 2009/0303126 A1* | 12/2009 | Jain et al. | 342/368 |
| 2010/0046512 A1* | 2/2010 | Xia et al. | 370/389 |
| 2011/0014919 A1* | 1/2011 | Otte et al. | 455/442 |
| 2011/0093592 A1* | 4/2011 | Kubinszky et al. | 709/224 |
| 2011/0099281 A1* | 4/2011 | Bakker et al. | 709/228 |
| 2011/0176512 A1* | 7/2011 | Sun | 370/331 |
| 2011/0261812 A1* | 10/2011 | Kini et al. | 370/389 |
| 2011/0286427 A1* | 11/2011 | Shirota et al. | 370/331 |
| 2011/0310794 A1* | 12/2011 | Jang et al. | 370/328 |
| 2012/0225649 A1* | 9/2012 | Yerrabommanahalli et al. | 455/434 |
| 2012/0327796 A1* | 12/2012 | Ozaki et al. | 370/252 |
| 2012/0327940 A1* | 12/2012 | Long | 370/392 |
| 2013/0070684 A1* | 3/2013 | Yu et al. | 370/328 |
| 2013/0107895 A1* | 5/2013 | Wentink | 370/477 |
| 2014/0029568 A1* | 1/2014 | Wang et al. | 370/330 |
| 2014/0222966 A1* | 8/2014 | Marins et al. | 709/219 |
| 2014/0313908 A1* | 10/2014 | da Silva et al. | 370/252 |
| 2015/0124704 A1* | 5/2015 | Asterjadhi et al. | 370/328 |

OTHER PUBLICATIONS

Office Action dated Oct. 10, 2015 for Chinese Patent Application No. 201310311690.8.

* cited by examiner

DUAL MODE TUNNELING REFERENCE MODEL

FIG. 4

*IMPROVED 1X LAYER 3 GENERAL PAGE MESSAGE FORMAT*

| FIELD | LENGTH (BITS) |
|---|---|
| MSGTYPE | 8 |
| NUMTLACHEADERRECORDS | 4 |
| RESERVED | 3 |
| 1XL3PDULENGTH | 16 |
| SERVICEOPTION | 16 |

400

APPARATUS AND METHOD FOR TUNNELED GPM

CROSS-REFERENCE TO RELATED APPLICATIONS

This application claims the benefit of the following U.S. Provisional applications, each of which is herein incorporated by reference for all intents and purposes.

| SERIAL NUMBER | FILING DATE | TITLE |
| --- | --- | --- |
| 61,674,479 | Jul. 23, 2012 | PROBLEM IN TUNNELED GPM |

BACKGROUND OF THE INVENTION

1. Field of the Invention

This invention relates in general to the field of cellular communications, and more particularly to a mechanism for indicating service options in a tunneled 1xRTT General Paging Message.

2. Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service. As such, so-called circuit switched voice links have been fielded that guarantee this quality of service.

And although wireless cellular network technologies have continued to provide improvements related to the ability to process voice calls, there has also been an enormous pull on the industry to provide for the reliable and efficient transfer of packetized data. As a result, the incremental developments in high speed packetized data networks have not always tracked with the development of voice networks. It is a goal within the industry to field a more unified solution that would provide both reliable voice and high speed data access, however, the industry is not at that point presently. Consequently, it is common practice to field a mobile system that provides for voice communications over one type of circuit switched network, say CDMA2000 1xRTT, and high speed data communications over another type of network, say LTE, which provides exclusively for packetized data and does not provide the quality of service that users prefer to support voice communications. In the near future, these hybrid solutions will be prevalent within the art.

In order to field such a hybrid system, designers are forced to develop protocols for those instances where two or more co-fielded networks create conflict, or where two or more co-fielded networks are required to interoperate.

This application deals with one such instance, that is, the switching between a high speed data network that provides exclusively for packetized data communications over to a circuit switched voice network in order to process and incoming or outgoing call or other circuit switched event, and more specifically, how service options for circuit switched events are communicated.

Presently, protocols exist for fallback to a circuit switched network during a high speed data session in order to process an incoming or outgoing call. Most present day techniques follow a form of "tunneling," where notification data associated with the call is encapsulated into a sequence of data units that are exchanged over the packetized data network. But the current provisions do not provide for the specification of a service option other than a default option.

Accordingly, what is needed is a technique that would allow a mobile station to be notified of a circuit switched event over a packetized data network, where the technique provides for specification of a service option for the circuit switched event as part of a tunneled message.

SUMMARY OF THE INVENTION

The present invention, among other applications, is directed to solving the above-noted problems and addresses other problems, disadvantages, and limitations of the prior art.

The present invention provides a superior technique for providing service options within a tunneled General Page Message. In one embodiment, an apparatus provides notification of a circuit switched event over a packetized data network. The apparatus includes a packetized data modem that is configured to receive lower level packetized data over the packetized data network that comprises the notification. The packetized data modem has a first service-oriented tunneling link access control processor that is configured to decapsulate an Improved 1x Layer 3 General Page Message (IGPM) from the lower level packetized data, where the IGPM comprises a service option corresponding to the circuit switched event.

One aspect of the present invention contemplates an apparatus that provides notification of a circuit switched event over a packetized data network. The apparatus includes an internetwork interface that is configured to transmit lower level packetized data over the packetized data network that comprises the notification. The packetized data modem has a first service-oriented tunneling link access control processor that is configured to encapsulate an Improved 1x Layer 3 General Page Message (IGPM) to render the lower level packetized data, where the IGPM comprises a service option corresponding to the circuit switched event.

Another aspect of the present invention comprehends a method for providing notification of a circuit switched event over a packetized data network. The method includes: within an internetwork interface, encapsulating an Improved 1x Layer 3 General Page Message (IGPM) to render lower level packetized data, where the IGPM comprises a service option corresponding to the circuit switched event; and transmitting the data over the packetized data network.

BRIEF DESCRIPTION OF THE DRAWINGS

These and other objects, features, and advantages of the present invention will become better understood with regard to the following description, and accompanying drawings where:

FIG. 4 is a diagram showing an exemplary improved 1x Layer 3 General Page Message format according to the present invention.

DETAILED DESCRIPTION

Figure 1:
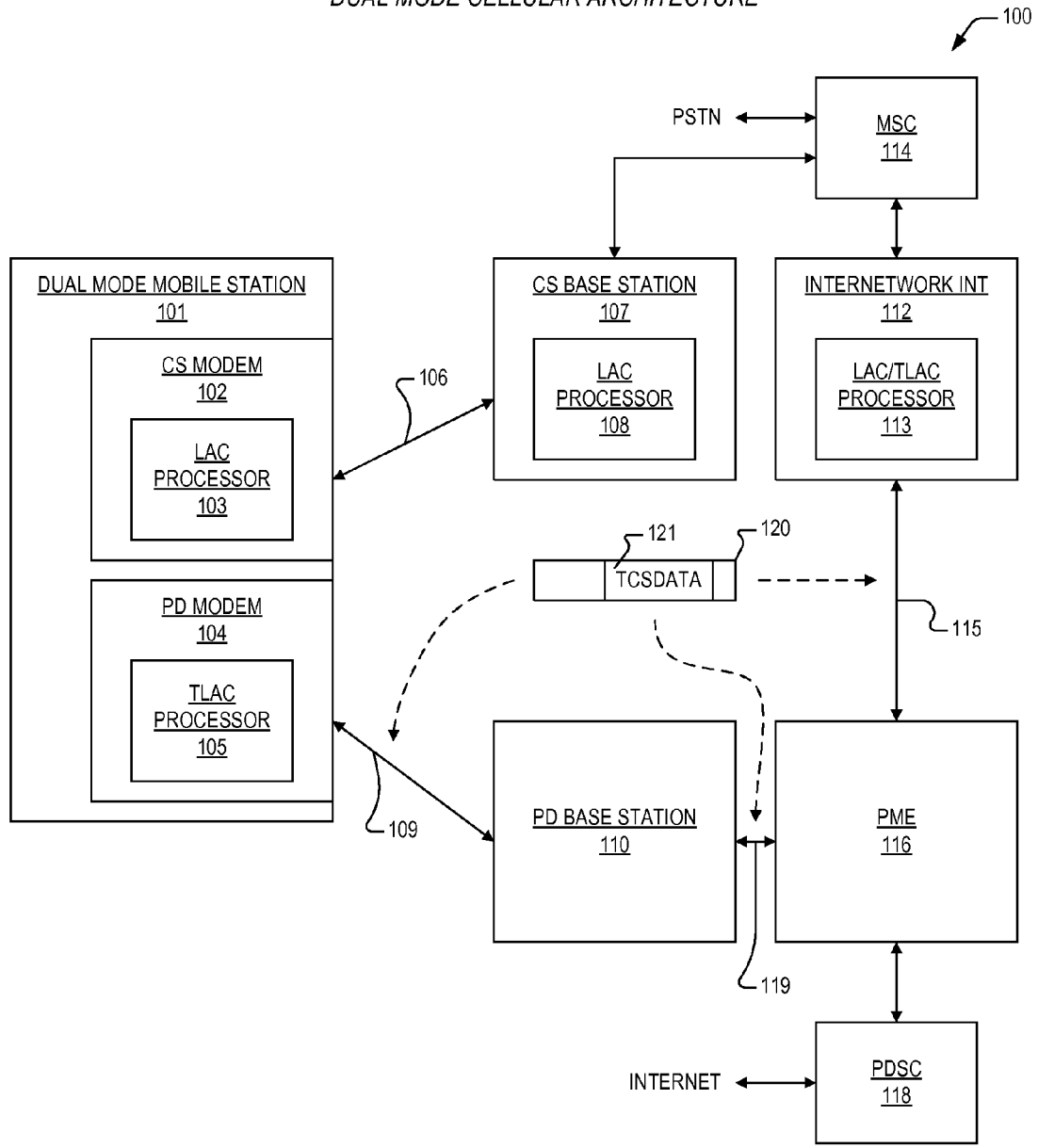
FIG. 1 is a block diagram illustrating a present day dual mode cellular architecture.

Exemplary and illustrative embodiments of the invention are described below. In the interest of clarity, not all features of an actual implementation are described in this specification, for those skilled in the art will appreciate that in the development of any such actual embodiment, numerous implementation-specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
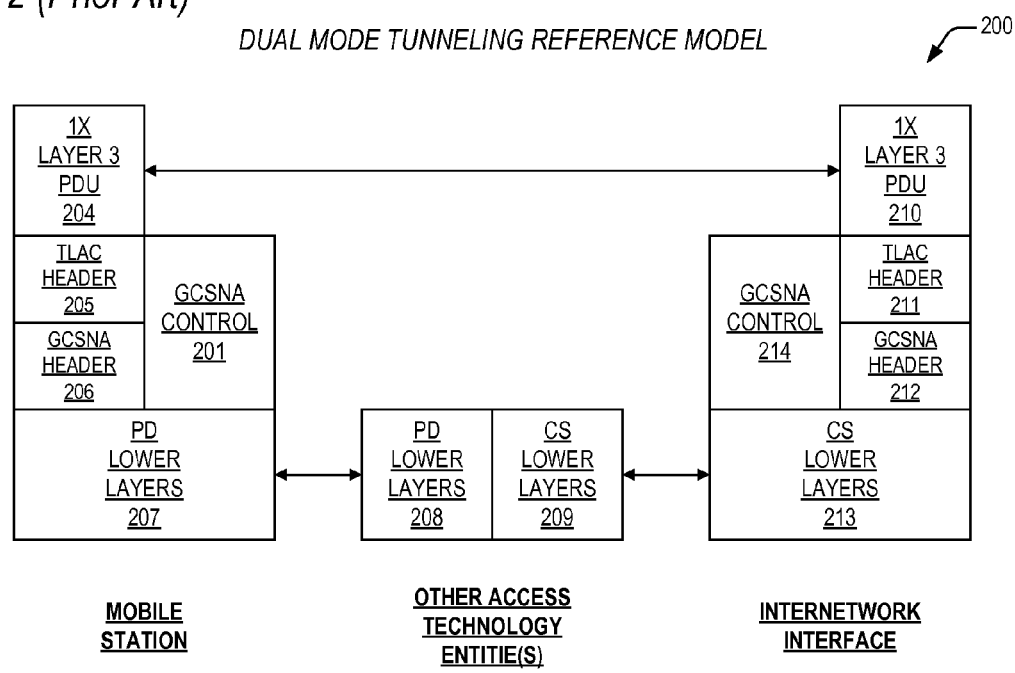
FIG. 2 is a block diagram depicting a present day dual mode tunneling reference model, such as may be employed in the architecture of FIG. 1.

In view of the above background discussion on CDMA2000 inter radio access interworking and associated techniques employed within a corresponding system to provide for signaling transactions for 1x circuit switched services to a mobile station, a discussion of the limitations associated with present day mechanisms will be presented within reference to FIGS. 1-2. Following this, a discussion of the present invention will be presented with reference to FIGS. 3-4. The present invention overcomes the limitations of present day tunneling mechanisms by providing a technique for signaling 1x circuit services in a tunneled general page message that include options associated with the enhanced variable rate codec (EVRC).

Consider FIG. 1, where a block diagram is presented illustrating a present day dual mode cellular architecture 100 for notifying a dual mode mobile station 101 of an incoming call or other circuit switched event over a packetized data radio link 109. The architecture 100 includes the mobile station 101, which has a circuit switched modem 102 for processing circuit switched cellular applications, and a packetized data modem 104, for processing packetized data applications. The mobile station 101 is coupled to a circuit switched base station 107 via a circuit switched radio link 106 and to a packetized data base station 110 over the packetized data radio link 109.

The circuit switched base station 107 is coupled to a mobile switching center 114. The mobile switching center 114 is coupled to an internetworking interface 112. The internetworking interface 112 is coupled to a packetized management entity PME 116 via a packetized data link 115. The mobile switching center 114 routes calls and events to/from a public switched telephone network (PSTN). The PME 116 is coupled to a packetized data switching center 118, which routes data and events to/from a packetized data network such as the Internet.

In operation, circuit switched calls and events over the PSTN are routed by the mobile switching center 114 to the circuit switched base station 107. All control and traffic associated with the calls or other events occurs over the circuit switched radio link 106 are processed by the circuit switched modem 102 within the mobile station 101. Likewise, packetized data and events over the internet are routed by the packetized data switching center 118 to a particular packetized data mobility entity 116 that is interfaced to the packetized base station 110 currently assigned to the mobile station 101. All control and traffic associated with the packetized data or other events occurs over the packetized data radio link 109 is processed by the packetized data modem 104 within the mobile station 101.

Of particular interest to the present application are scenarios and circumstances associated with certain present day dual mode configurations, one example of which is a dual mode mobile station 101 that is capable of processing circuit switched calls and other events over a code division multiple access (CDMA) radio link 106 such as might be found in a CDMA2000 1xRTT architecture, and that processes packetized data and other events over a packetized data radio link 109 such as might be found in a Long Term Evolution (LTE) architecture. As one skilled in the art will appreciate, the CDMA2000 1xRTT circuit switched architecture (or "1x" architecture) is well known in the art for processing circuit switched calls ("voice calls"), and the LTE architecture is well known and is presently being fielded in major metropolitan centers around the world as an improvement in packetized data communications capabilities over the currently fielded EV-DO packetized data network. Additionally well known to those in the art is that LTE is a network exclusive to packetized data. That is, LTE does not support circuit switched events such as conventional cellular voice calls. LTE does provide support for so-called voice over internet protocol (VoIP) calls, but as one skilled in the art will appreciate, the disadvantages associated with present day VoIP techniques (e.g., jitter) make general use of VoIP in a mobile station 101 highly unlikely from a human factors perspective.

Going forward in the present application, examples and terminology will be employed from both 1x and LTE applications because these are well appreciated and prevalently fielded technologies that can be effectively employed to teach present day limitations and how the present invention is utilized to overcome these limitations, however, the present inventor notes that the scope of the present invention is not to be limited to 1x and LTE, but rather extended to comprehend dual mode cellular architectures where one of the radio links 109 employed must be utilized to notify the mobile station 101 of an incoming voice call or other event that is associated with a circuit switched link 106 having timing and quality of service properties and requirements unique to circuit switched applications.

In specific 1x and LTE terminologies, the packetized data mobility entity 116 is referred to as a mobility management entity (MME), which is the primary access node for an LTE network. The MME interfaces to many packetized data base stations 110, which are known as eNBs. The internetworking interface 112 is known as an interworking solution (IWS) and is responsible for interfacing a circuit switched network such as 1x to the LTE network. Hence, when packetized data is being transmitted over the packetized data network to the mobile station, for purposes of the present application, the circuit switched elements 102, 107, 112 shown in the architecture 100 are effectively idle. Packetized data is being routed to/from the internet via the packetized data switching center 118, through the packetized data mobility entity 116, through the packetized data base station 110, and over the packetized data radio link 109 to/from the packetized data modem 104 within the mobile station.

But when a timely circuit switched event (e.g., a call) comes into the mobile switching center 114 that is targeted for the mobile station 101, the mobile station must be notified—over the packetized data radio link 109—that it must, in a timely fashion, cease processing packetized data and fall back to a circuit switched radio link 106 in order to proceed to process the timely CS event further, that is, to accept the call. Yet, because circuit switched and packetized data protocols are not equivalent, designers are working to provide techniques and mechanisms that allow for this notification to take place. One such mechanism that is employed in the 1x/LTE environment is tunneling, whereby tunneled circuit switched data (TCSDATA) 121 providing for notification, acknowledgement, and negotiation of circuit switched parameters associated with acceptance of a call and fallback to a circuit switched radio link 106 are encapsulated as the data portion within lower level data packets 120 that are transmitted/received over the packetized data network, which includes links 115, 119, and 109. Hence, as the name implies, circuit switched notification data 121 employs a data packet as a tunnel through which circuit switched parameters are transmitted/received.

This "tunneling" protocol is defined in E-UTRAN—cdma2000 1x Connectivity and Interworking Air Interface Specification, Version 2.0, April 2011, C.S0097-0, published by the 3rd Generation Partnership Project 2 (3GPP2) (hereinafter, "the '0097 Specification).

The internetwork interface 112 performs the interface between the mobile switching center 114 and the packetized data mobility entity 116, and is responsible for most of the processing associated with tunneling the circuit switched data 121. Tunneling packets 120 are routed through the mobility entity 116 and the base station 110 over the links 115, 119, 109, but processing of the data 121 is only required at the endpoints 101, 112. As regards present day circuit switched networks such as 1x, there is a great deal of configuration information such as service options, etc., which must be processed by the endpoints of a circuit switched event in order to guarantee quality of service, particularly as regards a General Page Message (GPM). In 1x, the protocol layer at with this information is processed is known as the link access control (LAC) layer. Hence, a LAC layer processor 103 to perform these operations for circuit switched events is depicted within the circuit switched modem 102. Likewise a LAC processor 108 for performing substantially similar layered processing is depicted within the circuit switched base station 107. As one skilled in the art will appreciate, were circuit switched events the only events that were processed by the mobile station 101, then the aforementioned elements 103, 108 would suffice, for processing that the LAC layer requires.

The packetized data modem 104 and packetized data base station 110 also include commensurate processing elements (not shown) to support layered communications over the packetized data network. However, in order to provide for notification of circuit switched calls and other events over the packetized data network, LAC layer processing elements are required in both the internetwork interface 112 and the packetized data modem 104. Thus, the packetized data modem 104 includes a TLAC processor 105 and the internetwork interface 112 includes a LAC/TLAC processor 113. These processors 105, 113, among other functions that will be described below, perform the LAC layer processing that is required in the packetized data modem 104 and internetwork interface 112, respectively, to provide for notification of circuit switched calls and other events over the packetized data network. Certainly, since the primary purpose of the internetwork interface 112 is to interface the circuit switched network to the packetized data network, it follows then that processing of LAC layer information is necessary, but limiting nonetheless. Yet, inclusion of a TLAC processor 105 within the packetized data modem 104 in the mobile station is perhaps more problematic because of the limited availability of processing resources and power within the mobile station 101.

At a broad level, packetized data applications such as Internet browsing, text messaging, and file transfers rely heavily on dynamic routing of segmented messages over a network. That is, messages are broken into segments and packets and are routed to a destination (e.g., the mobile station 101) over various routes. Consequently, packets may arrive at the destination out of order, or in error, and must be retransmitted and reassembled by apparatus in the destination element. This is the very reason that present day VoIP techniques do not lend themselves favorably toward use—packet delivery cannot be guaranteed at time intervals commensurate with favored use. On the other hand, the timing requirements to favor use in a file transfer, say, are much less demanding. As an example, LTE is very fast for data transfer purposes, but cannot guarantee the timing necessary to support voice activity.

Voice calls, in contrast, demand consistent and dedicated end-to-end quality of service in order to favor use. And circuit switched protocols such as 1x, for example, provide the necessary constraints and checks to ensure high quality of service. As one skilled in the art will appreciate, this quality of service is primarily achieved via dedicated links 106, which may carry no significant information for long periods of time, but which are nevertheless available.

As one skilled in the art will further appreciate, the hardware and software associated with processing circuit switched calls and events and processing packetized data and events is necessarily different. Hence, the dual mode mobile station 101 is depicted as having both a circuit switched modem 102 and a packetized data modem 104. One skilled will further appreciate that design constraints on a present day mobile station such as processing capability and battery life often restrict the mobile station 101 such that it may process events over only one of the two links 106, 109. This application considers the problems associated with notifying the mobile station 101 of a circuit switched event via a General Page Message when the mobile station 101 is actively processing packetized data over the packetized data link 109. The General Page Message is defined in Upper Layer (Layer 3) Signaling Standard for cdma2000 Spread Spectrum Systems, C.S0005-E, Version 2.0, published by 3GPP2 in July 2011 (hereinafter, "the '0005 Specification"). Among other things, the General Page Message is employed in a 1x system to prescribe service options such as rates corresponding to the Enhanced Variable Rate Codec (EVRC) (not shown) used in 1x mobile stations 101. And these rates are required by the '0005 Specification to be prescribed in a corresponding LAC layer Service Data Unit (SDU), that is, data that is provided to LAC layer in addition to that prescribed by a higher level (i.e., Layer 3) protocol data unit (PDU). These and other complexities associated with tunneled circuit switched data and corresponding processing will now be presented in more detail with reference to FIG. 2.

FIG. 2 is a block diagram 200 depicting a present day dual mode tunneling reference model, such as is used to communicate with the dual mode mobile station 101 of FIG. 1. The diagram 200 shows how an internetwork interface communicates with the dual mode mobile station though various other access technology entities, to affect notification of a circuit switched call or other event over a packetized data network, including a packetized data radio link, as has been discussed above with reference to FIG. 1. As in any layered architecture model, each endpoint must replicate each of the network model layers. Hence, the internetwork interface receives notification of the circuit switched event from the mobile switching center according to a circuit switched layered protocol such as 1x, which includes a highest level, Layer 3 and the event data is provided in the form of a 1x Layer 3 PDU 210. The Layer 3 PDU 210 is encapsulated into a data unit corresponding to a circuit switched link access control layer, which is in turn encapsulated into a tunneled circuit switched data unit (TCSDATA) by the addition of a tunneled link access control (TLAC) header 211, and a general circuit services notification application (GCSNA) header 212. A GCSNA control element 214 performs this encapsulation and header additions and passes the TCSDATA to circuit switched lower layers 213 for transmission to the mobile station.

Lower layer data units are communicated over one or more lower layer links to other access technology entities, which replicate lower layers 208-209 commensurate with the radio technologies employed. In general, the internetwork interface communicates to a circuit switched lower layer 209 and the mobile station communicates over its packetized data radio link to a packetized data lower layer 208. As noted above, the internetwork interface notifies the mobile station over its packetized data radio link of the circuit switched event by tunneling the notification in TCSDATA. This encapsulation of circuit switched notification data is performed at Layer 3 via the Layer 3 PDU 210 and is transmitted to the mobile station over the packetized data radio link and intervening links via the encapsulation scheme described above, as required by the '0097 Specification.

The other access technology entities affect lower layer translation from circuit switched to packetized data links and thus the notification is received by the mobile station via packetized data at packetized data lower layers 207. Since this is handled by the packetized data modem within the mobile station, no additional processing or resources are required over that required for receipt and transmission of normal packetized data. However, the packetized data modem within the mobile station must also provide processing for each of the corresponding layers 210-212 in the internetworking interface. Hence, the packetized data modem within the mobile station must provide, for circuit switched notification purposes only, processing resources for a the TCSDATA that is received which includes resources for encapsulation/decapsulation of a GCSNA header 206, encapsulation/decapsulation of a TLAC header 205, and processing for a layer 3 PDU 204. A GCSNA control element 201 in the mobile station provides for the encapsulation/decapsulation of the GCSNA and TLAC headers 205-206. The '0097 Specification clearly prescribes the dual mode tunneling reference model 200, as is described above.

The present inventor has noted, however, that there are several problems related to the processing of circuit switched events through the tunneling protocol prescribed in the '0097 Specification. More specifically, the present inventor has observed that, as has been discussed above, the '0097 Specification specifies a tunnel exclusively for 1x Layer 3 PDUs 204, 210, and that if the configuration information that is required to be transmitted to the mobile station is not prescribed in a 1x Layer 3 PDU 204, 210 according to the '0005 Specification, then such is limiting to interoperability. Furthermore, the present inventor has noted that certain fields associated with a particular 1x Layer 3 PDU 204, 210 provide no meaningful information whatsoever in a tunneling context.

Consider, for example, the General Page Message (GPM), one of many 1x Layer 3 PDUs 204, 210. As is prescribed in the '0005 Specification, the GPM consists of common fields as shown below in Table 1.

TABLE 1

General Page Message Common Fields

| Field | Length (bits) |
| --- | --- |
| CONFIG_MSG_SEQ | 6 |
| ACC_MSG_SEQ | 6 |
| CLASS_0_DONE | 1 |
| CLASS_1_DONE | 1s |
| TMSI_DONE | 1 |
| ORDERED_TMSIS | 1 |
| BROADCAST_DONE | 1 |
| RESERVED | 4 |
| ADD_LENGTH | 3 |
| ADD_FIELD | 8 × ADD_LENGTH |

For a GPM addressed to a mobile station, the '0005 Specification prescribes the following additional fields shown in Table 2.

TABLE 2

Additional Fields for GPM Addressed to Mobile Station

| Field | Length (bits) |
|---|---|
| SERVICE_OPTION | 0 or 16 |

To select any service option other than a default option, the '0005 Specification requires the base station to set the SERVICE_OPTION field (i.e., the SDU_INCLUDED field is set to "1"), the base station shall set this field to the service option code (as, corresponding to the requested service option; otherwise, the base station is to omit this field from the PDU. However, as one skilled in the art will appreciate, in a tunneled architecture as has been described above, it is impossible to include a service data unit (SDU), because it is not part of a Layer 3 PDU and only the Layer 3 PDU is encapsulated for tunneling. Thus, the SDU corresponding to the requested service option cannot be transmitted. In particular, any of the service option codes corresponding to EVRC options require the SERVICE_OPTION field set to "1" and transmission of a corresponding SDU, but as it noted above, the corresponding SDU cannot be transmitted through the tunnel since it is not a field in the GPM PDU. Accordingly, the present inventor has recognized that it is impossible in a tunneled environment as prescribed by the '0097 Specification to specify any service option other than the default option. This consequence is limiting to interoperability.

Likewise, the present inventor has observed that all of the GPM common fields described above with reference to Table 1 are not only useless in a tunneled environment, but their inclusion in the Layer 3 GPM PDU may be confusing.

The present invention overcomes the above noted problems, and others, by providing a technique for transmitting a tunneled Layer 3 General Page Message PDU which 1) enables a base station to specify particular service options that do not require transmission of a corresponding SDU, and which 2) strips away confusing fields associated with a Layer 3 GPM that is transmitted over a circuit switched radio link. The present invention will now be discussed with reference to FIGS. 3-4.

Figure 3:
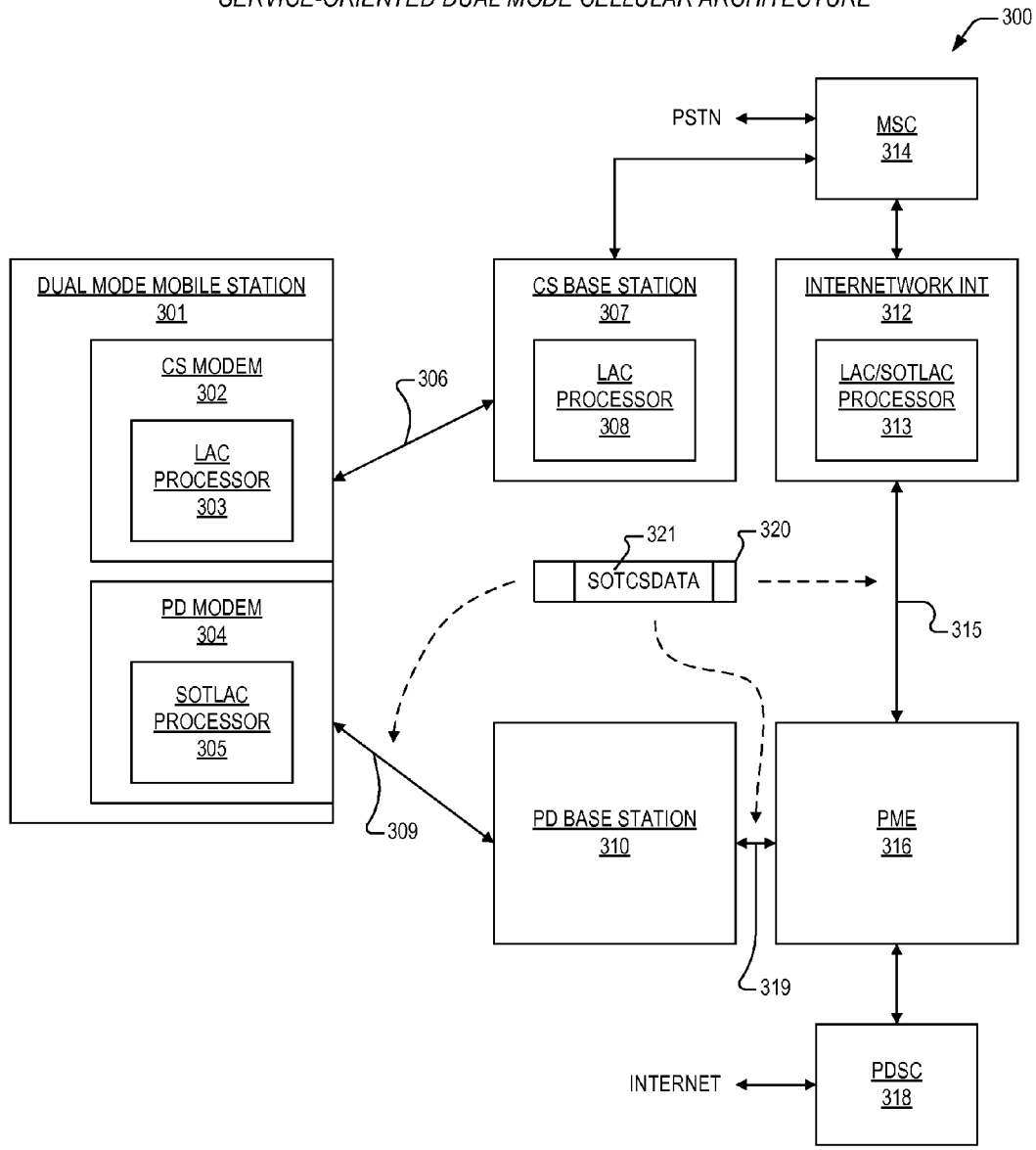
FIG. 3 is a block diagram featuring a service-oriented dual mode cellular architecture according to the present invention.

Turning now to FIG. 3, a block diagram is presented illustrating a service-oriented dual mode cellular architecture 300 for notifying a dual mode mobile station 301 of an incoming call or other circuit switched event over a packetized data radio link 309. The architecture 300 includes the mobile station 301, which has a circuit switched modem 302 for processing circuit switched cellular applications, and a packetized data modem 304, for processing packetized data applications. The mobile station 301 is coupled to a circuit switched base station 307 via a circuit switched radio link 306 and to a packetized data base station 310 over the packetized data radio link 309.

The circuit switched base station 307 is coupled to a mobile switching center 314. The mobile switching center 314 is coupled to an internetworking interface 312. The internetworking interface 312 is coupled to a packetized management entity PME 316 via a packetized data link 315. The mobile switching center 314 routes calls and events to/from a public switched telephone network (PSTN). The PME 316 is coupled to a packetized data switching center 318, which routes data and events to/from a packetized data network such as the Internet.

In operation, circuit switched calls and events over the PSTN are routed by the mobile switching center 314 to the circuit switched base station 307. All control and traffic associated with the calls or other events occurs over the circuit switched radio link 306 are processed by the circuit switched modem 302 within the mobile station 301. Likewise, packetized data and events over the internet are routed by the packetized data switching center 318 to a particular packetized data mobility entity 316 that is interfaced to the packetized base station 310 currently assigned to the mobile station 301. All control and traffic associated with the packetized data or other events occurs over the packetized data radio link 309 is processed by the packetized data modem 304 within the mobile station 301.

One embodiment of the present invention contemplates a dual mode mobile station 301 that is capable of processing circuit switched calls and other events over a code division multiple access (CDMA) radio link 306 such as might be found in a CDMA2000 1xRTT architecture, and that processes packetized data and other events over a packetized data radio link 309 such as LTE. Although the embodiment employs 1xRTT and LTE, it is noted that these technologies are not intended to limit applications of the present invention, and the scope of the present invention extends to other circuit switched and packetized data architectures where circuit switched data is tunneled over the packetized data radio link 309.

In specific 1x and LTE terminologies, the packetized data mobility entity 316 is referred to as a mobility management entity (MME), which is the primary access node for an LTE network. The MME interfaces to many packetized data base stations 310, which are known as eNBs. The internetworking interface 312 is known as an interworking solution (IWS) and is responsible for interfacing a circuit switched network such as 1x to the LTE network. Hence, when packetized data is being transmitted over the packetized data network to the mobile station, for purposes of the present application, the circuit switched elements 302, 307, 312 shown in the architecture 300 may be idle. Packetized data is being routed to/from the internet via the packetized data switching center 318, through the packetized data mobility entity 316, through the packetized data base station 310, and over the packetized data radio link 309 to/from the packetized data modem 304 within the mobile station.

When a timely circuit switched event (e.g., a call) comes into the mobile switching center 314 that is targeted for the mobile station 301, the mobile station is notified over the packetized data radio link 309 that it must, in a timely fashion, cease processing packetized data and fall back to a circuit switched radio link 306 in order to proceed further. Like the architecture 100 of FIG. 1, the architecture 300 according to the present invention according to the 1x/LTE environment employs tunneling to notify the mobile station 301 of a circuit switched event. Yet, in contrast to the present day architecture 100, the architecture 300 according to the present invention employs service-oriented mechanisms and techniques that allow for the efficient transmission of a plurality of service options in an improved 1x Layer 3 General Page Message (IGPM). The IGPM according to the present invention, in addition to providing for communication of a plurality of service options, does not require transmission of a corresponding LAC layer Service Data Unit, and does not include confusing fields as are noted above in Table 1.

Accordingly, service-oriented tunneled circuit switched data (SOTCSDATA) 321 providing for notification, acknowledgement, and negotiation of circuit switched parameters associated with acceptance of a call and fallback to a circuit switched radio link 306 is encapsulated as the data portion within lower level data packets 320 that are transmitted/received over the packetized data network, which includes links 315, 319, and 309. Hence, as the name implies, service-oriented tunneled circuit switched notification data 321 employs a data packet as a tunnel through which circuit switched parameters are transmitted/received.

The "tunneling" protocol according to the present invention is entirely compliant with the '0097 Specification, and includes the improved GPM as a variation to the '0005 Specification.

The internetwork interface 312 performs the interface between the mobile switching center 314 and the packetized data mobility entity 316, and is responsible for most of the processing associated with tunneling the service-oriented tunneled circuit switched data 321. Tunneling packets 320 are routed through the mobility entity 316 and the base station 310 over the links 315, 319, 309, but processing of the data 321 is only required at the endpoints 301, 312. As regards present day circuit switched networks such as 1x, there is a great deal of configuration information such as service options, etc., which must be processed by the endpoints of a circuit switched event in order to guarantee quality of service, particularly as regards a General Page Message (GPM). In 1x, the protocol layer at with this information is processed is known as the link access control (LAC) layer. The mobile station 301 also includes a LAC layer processor 303 within the circuit switched modem 302 to perform operations for circuit switched events as described above with reference to FIG. 1. Likewise a LAC processor 308 for performing substantially similar layered processing is depicted within the circuit switched base station 307.

The packetized data modem 304 and packetized data base station 310 also include commensurate processing elements (not shown) to support layered communications over the packetized data network. However, in order to provide for notification of circuit switched calls and other events over the packetized data network, a LAC layer processing elements are required in both the internetwork interface 312 and the packetized data modem 304. Thus, the packetized data modem 304 includes a service-oriented tunneled link access control (SOTLAC) processor 305 and the internetwork interface 312 includes a LAC/SOTLAC processor 313. These processors 305, 313, among other functions that will be described below, perform the LAC layer processing that is required in the packetized data modem 304 and internetwork interface 312, respectively, to provide for notification of circuit switched calls and other events over the packetized data network. However, in contrast to the architecture 100 of FIG. 1, the architecture 300 according to the present invention provides the SOTLAC processor 305 in the mobile station 301 and the LAC/SOTLAC processor 313 in the internetwork interface 312 to receive, transmit, and process 1x Layer 3 IGMs according to the present invention, whereby service options such as rates corresponding to the Enhanced Variable Rate Codec (EVRC) (not shown) used in 1x mobile stations 301 can be easily prescribed, without a requirement for the transmission of lower level SDUs.

The mobile station 301 and internetwork interface 312 according to the present invention are configured to perform the functions and operations as discussed above. The stations 301, 312 comprise logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the stations 301, 312 may be shared with other circuits, microcode, etc., that are employed to perform other functions and/or operations within the stations 301, 312. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Referring now to FIG. 4, a diagram 400 is presented depicting fields within an improved 1x Layer 3 General Page Message (IGPM) according to the present invention. Field sizes are exemplary and are presented to clearly teach aspects of the present invention, however such is not intended to limit the scope of the invention.

The IGPM protocol data unit (PDU) comprises a 1x Layer 3 PDU and includes an 8-bit message type field (MSGTYPE), a 4-bit, number of tunneled link access control header records field (NUMTLACHEADERRECORDS), a 3-bit reserved field (RESERVED), a 1x Layer 3 protocol data unit length field (1XL3PDULENGTH), and a 16-bit service option field (SERVICEOPTION). The MSGTYPE field is employed to indicate a particular Layer 3 message type in accordance with the '0005 Specification, with the exception that a value of 17 in this field indicates the IGPM. NUMTLACHEADERRECORDS is set to 0 for the IGPM. RESERVED is a field that is unused. For the IGPM, 1XL3PDULENGTH is set to 2. And the SERVICEOPTION field is set to indicate a particular service option in accordance with Administration of Parameter Value Assignments for cdma2000 Spread Spectrum Standards, Release G, C.R1001-G, published on 19 Jun. 2009 by 3GPP2.

When an IGPM according to the present invention is transmitted by the internetwork interface 312 to the mobile station 301, only the fields shown in FIG. 4 are transmitted, and thus, the transmission of confusing fields associated with a present day GPM (see Table 1) is precluded.

It should be borne in mind that all of the above and similar terms are to be associated with appropriate physical quantities and are merely convenient labels applied to these quantities. Unless specifically stated otherwise, or as is apparent from the discussion, terms such as "processing," "computing," "calculating," "determining," "displaying," or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A system for providing notification of a circuit switched event over a packetized data network, the system comprising:
    a packetized data modem, configured to receive lower level packetized data over the packetized data network that comprises the notification, said packetized data modem comprising:
    a first service-oriented tunneling link access control processor, configured to decapsulate an Improved 1x Layer 3 General Page Message (IGPM) from the lower level packetized data, wherein said IGPM comprises a service option field and does not comprise the following fields corresponding to a 1x Layer 3 protocol data unit (PDU) General Page Message: CONFIG MES SEQ, ACC MSG SEQ, CLASS 0 DONE, CLASS 1 DONE, TMSI DONE, ORDERED TMSIS, BROADCAST DONE, RESERVED, and ADD LENGTH.

2. The system as recited in claim 1, wherein said packetized data modem is disposed within a dual mode mobile station that comprises a modem compatible with CDMA2000 1xRTT protocol, and wherein said packetized data modem comprises a modem compatible with Long Term Evolution (LTE) protocol.

3. The system as recited in claim 2, wherein said IGPM comprises a Layer 3 (PDU) compliant with the CDMA2000 1xRTT tunneling protocol.

4. The system as recited in claim 3, wherein said service option field prescribes a circuit switched service type for operation of said dual mode mobile station.

5. The system as recited in claim 4, wherein said circuit switched service type comprises an enhanced variable rate codec (EVRC) option.

6. The system as recited in claim 1, further comprising:
    an internetwork interface, operatively coupled to said packetized data modem via the packetized data network, configured to transmit the notification to a dual mode mobile station.

7. The system as recited in claim 6, wherein said internetwork interface comprises:
    a second service-oriented tunneling link access control processor, configured to encapsulate said IGPM to render said lower level packetized data.

8. A system for providing notification of a circuit switched event over a packetized data network, the system comprising:
    an internetwork interface, configured to transmit lower level packetized data over the packetized data network that comprises the notification, said internetwork interface comprising:
        a first service-oriented tunneling link access control processor, configured to encapsulate an Improved 1x Layer 3 General Page Message (IGPM) to render said lower level packetized data, wherein said IGPM comprises a service option field and does not comprise the following fields corresponding to a 1x Layer 3 protocol data unit (PDU) General Page Message: CONFIG MES SEQ, ACC MSG SEQ, CLASS 0 DONE, CLASS 1 DONE, TMSI DONE, ORDERED TMSIS, BROADCAST DONE, RESERVED, and ADD LENGTH.

9. The system as recited in claim 8, wherein said IGPM comprises a Layer 3 (PDU) compliant with the CDMA2000 1xRTT tunneling protocol.

10. The system as recited in claim 9, wherein said service option field prescribes a circuit switched service type for operation of a dual mode mobile station.

11. The system as recited in claim 10, wherein said circuit switched service type comprises an enhanced variable rate codec (EVRC) option.

12. The system as recited in claim 8, further comprising:
    a packetized data modem, operatively coupled to said internetwork interface, configured to receive said lower level packetized data over the packetized data network that comprises the notification.

13. The system as recited in claim 12, wherein said packetized data modem comprises:
    a second service-oriented tunneling link access control processor, configured to decapsulate said Improved 1x Layer 3 General Page Message (IGPM) from said lower level packetized data.

14. The system as recited in claim 13, wherein said packetized data modem is disposed within a dual mode mobile station that comprises a modem compatible with CDMA2000 1xRTT protocol, and wherein said packetized data modem comprises a modem compatible with Long Term Evolution (LTE) protocol.

15. A method for providing notification of a circuit switched event over a packetized data network, the method comprising:
    within an internetwork interface, encapsulating an Improved 1x Layer 3 General Page Message (IGPM) to render lower level packetized data, wherein said IGPM comprises a service option field and does not comprise the following fields corresponding to a 1x Layer 3 protocol data unit (PDU) General Page Message: CONFIG MES SEQ, ACC MSG SEQ, CLASS 0 DONE, CLASS 1 DONE, TMSI DONE, ORDERED TMSIS, BROADCAST DONE, RESERVED, and ADD LENGTH; and
    transmitting the data over the packetized data network.

16. The method as recited in claim 15, wherein the IGPM comprises a Layer 3 (PDU) compliant with the CDMA2000 1xRTT tunneling protocol.

17. The method as recited in claim 16, wherein the service option field prescribes a circuit switched service type for operation of a dual mode mobile station.

18. The method as recited in claim 17, wherein the circuit switched service type comprises an enhanced variable rate codec (EVRC) option.

19. The method as recited in claim 18, further comprising:
    via a packetized data modem that is operatively coupled to the internetwork interface, receiving the lower level packetized data over the packetized data network that comprises the notification.

20. The method as recited in claim 19, wherein said receiving comprises:
    decapsulating the IGPM from the lower level packetized data.

21. The method as recited in claim 19, wherein the packetized data modem is disposed within the dual mode mobile station, and wherein the dual mode mobile station is compliant with CDMA2000 1xRTT protocol, and wherein the packetized data modem is compliant with Long Term Evolution (LTE) protocol.

* * * * *